Patented Apr. 1, 1941

2,237,042

UNITED STATES PATENT OFFICE 2,237,042

METHOD AND BATCH FOR MAKING COLORED GLASS

Harry A. Truby, New Kensington, Pa., assignor to Pittsburgh Plate Glass Company, Allegheny County, Pa., a corporation of Pennsylvania No Drawing. Application April 23, 1938, Serial No. 203,827

13 Claims. (Cl. 106—36.1)

The present invention relates to a process of making colored glass which may be either opaque or transparent and more particularly to red-colored glass.

The primary object of my invention is to provide a colored glass of red or pink color in which the amount of gold coloring agent therein is reduced to a minimum.

Another object of my invention is to provide a composition for the production of red-colored glass in which the desired color is imparted by incorporating a small amount of gold halide and selenium into the batch used in making the glass.

These and other objects of the invention will be more readily apparent in the following detailed description of the invention.

In making a pink or red-colored glass, it has heretofore been the practice to impart the desired color to the glass by incorporating in the batch, from which the glass is formed, either a relatively large amount of a gold salt or a relatively large amount of selenium which renders the glass of relatively high cost.

I have made the discovery that a permanent red color may be imparted to glass by mixing with the batch containing a small amount of a gold salt a comparatively small amount of selenium, and that by utilizing the selenium to activate the gold salt I am enabled to reduce the amount of gold salt required so that the cost of the glass product is reduced materially.

The glass, produced by the use of small amounts of gold salt and selenium together, gives the required color ranging from a pink to a deep red, the cost of the gold under these conditions being reduced to a negligible amount, as compared with the cost involved if similar colors are produced by the use of gold salts alone in the making of red-colored glass by processes heretofore used.

The glass produced by my improved process may be of the transparent type such as the well known "ruby glass" or it may be of the opaque type, such as "carrara glass," dependent on whether or not an opacifying agent, such as fluorspar or fluoride is used in the glass making batch.

A typical batch for the production of opaque glass having a red color imparted thereto is as follows:

| | |
|---|---|
| Sand | pounds 566 |
| Soda-ash | do 166 |
| Potassium nitrate | do 90 |
| Feldspar | do 618 |
| Sodium silico fluoride | do 68 |
| Arsenious oxide | do 15 |
| Fluorspar | do 9 |
| Gold chloride | grams 12 |
| Selenium | do 1.5 |

For example, in the above-mentioned batch having a total weight of 1532.03 pounds, the ingredients enumerated will be present in the following percentages:

| | Per cent by weight |
|---|---|
| Sand | 37.0 |
| Soda-ash | 10.8 |
| Potassium nitrate | 5.9 |
| Feldspar | 40.5 |
| Sodium silico fluoride | 4.45 |
| Arsenious oxide | .987 |
| Fluorspar | .59 |
| Gold chloride | .00173 |
| Selenium | .000216 |

The above-mentioned ingredients are thoroughly admixed to form a glass batch, placed either in an open or in a closed pot, and heated to the complete fusion point of the mixture. The glass produced may be of a light red color, ordinarily described as pink, but darker shades may be produced by increasing the amount of gold halide without increasing the amount of selenium used.

It will be noted that in the above-mentioned glass-forming batch approximating 1532 pounds in weight, less than half an ounce (avoirdupois) of the relatively expensive gold chloride is required.

Instead of using gold chloride in the above-mentioned batch mixture, other salts of gold, such as the other halogen salts like gold bromide, or gold iodide, may be employed in the proportions stated for gold chloride.

A transparent form of red glass may be produced if desired, by omitting opacifying agents such as the fluoride and fluorspar from the batch mixture. Also, the colored glass may be annealed, if desired.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

What I claim is:

1. A coloring composition for imparting a permanent red color to glass which comprises a mixture of small amounts of a gold halide and selenium.

2. A coloring composition for imparting a permanent red color to glass which comprises a mixture of small amounts of gold chloride and selenium.

3. A coloring composition for imparting a permenent red color to glass which comprises a mixture of small amounts of gold bromide and selenium.

4. A coloring composition for imparting a permanent red color to glass which comprises a mixture of small amounts of gold iodide and selenium.

5. A coloring composition for imparting a permanent red color to glass which comprises a mixture of approximately .00173 per cent, by weight, of gold halide and approximately .000216 per cent, by weight, of selenium.

6. A glass batch for producing transparent red-colored glass comprising glass-forming ingredients, and color-imparting agents comprising a mixture of approximately .00173 per cent, by weight, of a gold halide, and approximately .000216 per cent, by weight, of selenium.

7. A glass batch for producing opaque red-colored glass comprising a mixture of glass-forming ingredients, an opacifying agent, and color-imparting agents comprising a mixture of small amounts of a gold halide and selenium.

8. A glass batch for producing red-colored glass comprising the following ingredients in suitable admixture, and approximately in the proportions stated:

|  | Per cent by weight |
|---|---|
| Sand | 37.0 |
| Soda-ash | 10.8 |
| Potassium nitrate | 5.9 |
| Feldspar | 40.5 |
| Sodium silico fluoride | 4.45 |
| Arsenious oxide | .987 |
| Fluorspar | .59 |
| Gold chloride | .00173 |
| Selenium | .000216 |

9. A process of producing a permanently red-colored opaque glass which comprises admixing suitable amounts of sand, soda-ash, potassium nitrate, feldspar, sodium silico fluoride, arsenious oxide and fluorspar, and adding a coloring agent thereto consisting of small amounts of a gold halide and selenium, and heating the mixture until completely fused.

10. A process of producing a permanently red-colored transparent glass which comprises admixing suitable amounts of sand, soda-ash, potassium nitrate, feldspar, and arsenious oxide, and adding a coloring agent thereto consisting of small amounts of a gold halide and selenium, heating the mixture until complete fusion thereof, and then annealing the glass product.

11. A process as set forth in claim 10, in which the coloring agent comprises small amounts of gold chloride and selenium.

12. A process as set forth in claim 10, in which the coloring agent comprises a mixture of small amounts of gold bromide and selenium.

13. A process as set forth in claim 10, in which the coloring agent comprises a mixture of small amounts of gold iodide and selenium.

HARRY A. TRUBY.